(12) United States Patent
Hayashi et al.

(10) Patent No.: US 7,326,488 B2
(45) Date of Patent: Feb. 5, 2008

(54) DIFFUSION FILM, ELECTRODE HAVING THE DIFFUSION FILM, AND PROCESS FOR PRODUCING DIFFUSION FILM

(75) Inventors: Michinao Hayashi, Tokyo (JP); Tohru Sugitani, Nara (JP); Yoshitaka Asano, Nara (JP)

(73) Assignee: Nippon Valqua Industries, Ltd., Tokyo (JP)

( * ) Notice: Subject to any disclaimer, the term of this patent is extended or adjusted under 35 U.S.C. 154(b) by 0 days.

(21) Appl. No.: 10/499,180

(22) PCT Filed: Dec. 13, 2002

(86) PCT No.: PCT/JP02/13073

§ 371 (c)(1),
(2), (4) Date: Jun. 16, 2004

(87) PCT Pub. No.: WO03/052844

PCT Pub. Date: Jun. 26, 2003

(65) Prior Publication Data
US 2005/0173244 A1   Aug. 11, 2005

(30) Foreign Application Priority Data
Dec. 17, 2001  (JP) .............................. 2001-383319

(51) Int. Cl.
*H01M 4/86* (2006.01)
(52) U.S. Cl. .............................. 429/42; 429/40; 429/45; 524/545; 524/544
(58) Field of Classification Search ................ 252/511; 204/295, 282; 521/27, 28
See application file for complete search history.

(56) References Cited

U.S. PATENT DOCUMENTS 3,329,530 A  *  7/1967  Yutaka et al. .................. 429/42

(Continued)

FOREIGN PATENT DOCUMENTS

JP      52-97133 A      8/1977

(Continued)

OTHER PUBLICATIONS http://www.matweb.com/search/SpecificMaterial.asp?bassnum=O1900.*

(Continued)

*Primary Examiner*—Susy Tsang-Foster
*Assistant Examiner*—Cynthia Lee
(74) *Attorney, Agent, or Firm*—The Webb Law Firm, P.C.

(57) ABSTRACT

A diffusion membrane contains uncalcined polytetrafluoroethylene (PTFE), calcined PTFE and a conductive substance. An electrode has the diffusion layer (membrane) and a catalyst layer disposed thereon. A process for producing diffusion membranes comprises dispersing uncalcined PTFE, calcined PTFE and a conductive substance in a dispersion medium, removing the dispersion medium, adding a liquid lubricant followed by kneading, compressing the resultant kneaded product (preferably a rod-shaped preform) to expand the same into a membrane, and removing the liquid lubricant. The diffusion membrane preferably contains 1 to 30 wt % of the uncalcined PTFE and 5 to 30 wt % of the calcined PTFE. The conductive substance is desirably a combination of graphite and carbon black. The diffusion membrane is free from local variation in properties, has suitable mass producibility and can be produced inexpensively.

7 Claims, 1 Drawing Sheet

U.S. PATENT DOCUMENTS

| | | | | | |
|---|---|---|---|---|---|
| 4,337,140 | A | * | 6/1982 | Solomon | 204/292 |
| 4,581,121 | A | * | 4/1986 | Dailey et al. | 204/406 |
| 4,894,355 | A | * | 1/1990 | Takeuchi et al. | 502/101 |
| 4,927,514 | A | * | 5/1990 | Solomon et al. | 204/242 |
| 5,071,609 | A | * | 12/1991 | Tu et al. | 264/119 |
| 5,314,605 | A | * | 5/1994 | Matthiessen | 204/415 |
| 5,910,378 | A | * | 6/1999 | Debe et al. | 429/42 |
| 5,998,057 | A | * | 12/1999 | Koschany et al. | 429/42 |
| 6,051,340 | A | * | 4/2000 | Kawakami et al. | 429/231.95 |
| 2003/0022057 | A1 | * | 1/2003 | Iwasaki et al. | 429/46 |

FOREIGN PATENT DOCUMENTS

| | | |
|---|---|---|
| JP | 58-165254 A | 9/1983 |
| JP | 63-19979 B2 | 4/1988 |
| JP | 1-12838 B2 | 3/1989 |
| JP | 5-52031 B2 | 8/1993 |
| JP | 2001-085280 A | 3/2001 |
| WO | WO 9640510 A1 * | 12/1996 |

OTHER PUBLICATIONS

Patent Abstracts of Japan, Publication No. 60-074354, Apr. 26, 1985, Applicant: Fuji Electric Corp. Research & Development Ltd., "Gas-Diffusing Electrode for Fuel Cell".

Patent Abstracts of Japan, Publication No. 60-124358, Jul. 3, 1985, Applicant: Agency of Industrial Science & Technology, "Gas Diffusion Electrode of Fuel Cell".

Patent Abstracts of Japan, Publication No. 57-076760, May 13, 1982, Applicant: Japan Storage Battery Co., Ltd., "Gas Diffusion Electrode".

* cited by examiner

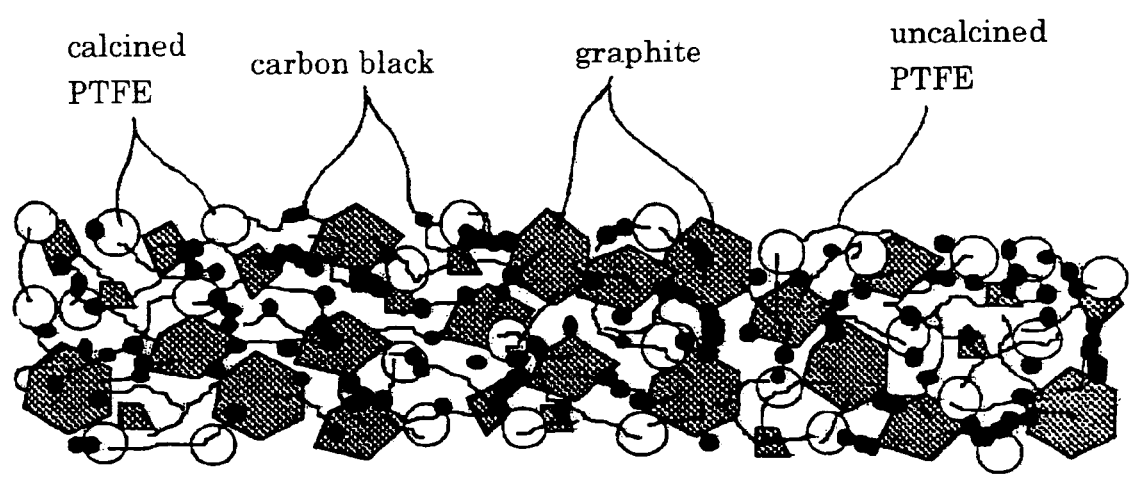

DIFFUSION FILM, ELECTRODE HAVING THE DIFFUSION FILM, AND PROCESS FOR PRODUCING DIFFUSION FILM

FIELD OF THE INVENTION

The present invention relates to a diffusion membrane, an electrode having the diffusion membrane, and a process for producing diffusion membranes. More particularly, the invention relates to a diffusion membrane that is combined with a Pt- or Pt/Ru alloy-containing catalyst layer and is used in preparing a diffusion layer member which constitutes an electrode for fuel cells, electric double layer capacitors or the like, and also relates to an electrode having the diffusion membrane and a process for producing diffusion membranes.

BACKGROUND OF THE INVENTION

Fuel cells comprise many types such as phosphoric acid fuel cells, molten carbonate fuel cells, solid electrolyte fuel cells, solid polymer electrolyte fuel cells and alkaline fuel cells. Recently, the ion-exchange membrane fuel cells (solid polymer electrolyte fuel cells) are of great interests, particularly because they operate at a high current density of 3 to 6 A/cm$^2$.

The ion-exchange membrane fuel cells have a polymer ion-exchange membrane comprised of a fluororesin with a sulfonic group (—SO$_3$H) in a side chain. The membrane is disposed between an anode electrode (fuel electrode) and a cathode electrode (air electrode) to form an assembly. Outside the assembly major surfaces are provided current collectors that also function as flow channels for the fuel (H$_2$) and oxidizer (air).

The electrodes are composed of carbon on which a catalyst such as platinum or platinum-ruthenium alloy is supported for promoting the electrode reactions.

The electrode reactions at the anode and the cathode are shown as follows:

Anode reaction: 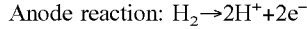

Cathode reaction: 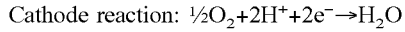

The hydrogen ions (H$^+$) move from the anode to the cathode through the ion-exchange groups in the membrane with water molecules.

The electrode reactions take place at the three-phase (liquid/gas/solid) interface among the electrolytic solution (liquid), air (gas) and catalyst layer (solid). The three-phase (liquid/gas/solid) interface must be adequately formed to prevent the electrode reaction rates from being controlled by the gas diffusion. Therefore, the electrodes are made porous and coated with water-repellent polytetrafluoroethylene (PTFE) resin.

A combination of a diffusion layer and a catalyst layer is called a gas diffusion electrode. Its function is to bring the fuel (H$_2$) and gas (oxygen O$_2$) into even contact with the catalyst layer such as of platinum.

The gas diffusion electrodes (particularly the diffusion layers) have another function of transmitting the electrons created at the catalyst layers, and therefore are required to have conductivity.

Furthermore, the diffusion layers have a function of distributing the gas to the catalyst layer, and therefore include a great number of pores.

In order to meet the need of ensuring the ion conductivity of the ion-exchange membrane and of hydration, humidified fuel (H$_2$) is used. The gas diffusion electrodes have water repellency to prevent the moisture for ion conductivity from clogging the pores in the diffusion layers to block the gas diffusion.

As described above, the gas diffusion electrodes for use in the fuel cells and other electrochemical devices are required to have gas diffusibility, gas permeability, water repellency and conductivity.

The diffusion membranes (layers) are generally produced by coating an electrode material such as a porous carbon fiber membrane or porous carbon paper with a dispersion mixture that contains carbon powder, polytetrafluoroethylene (PTFE) and a dispersion medium, by means of spraying or printing technique.

In such conventional processes, the coating of the porous carbon fiber membrane or porous carbon paper with a dispersion mixture that contains uncalcined polytetrafluoroethylene, conductive carbon and a dispersion medium is followed by repetitive rolling. This requires complex and multiple steps and increases the processing cost.

Moreover, the above process is complicated and has great difficulty in controlling the application of the dispersion mixture so as to achieve uniform properties throughout the resultant diffusion layer. It is also insufficient in terms of mass production capability for the diffusion membranes (layers). Furthermore, the porous carbon fiber membranes or porous carbon papers are expensive to cause cost problems.

To solve such problems, JP-A-2001-85280 (patent publication (i)) owned by the present applicant proposes a production process for polytetrafluoroethylene-containing sheet electrodes and a sheet electrode obtained by the process. This process comprises rolling a rod-shaped preform into a sheet electrode, wherein the preform comprises carbon fine powder, polytetrafluoroethylene and a liquid lubricant and has a specific relation with respect to the maximum length in the compression direction and that in a crosswise direction perpendicular to the compression direction.

The above process is capable of manufacturing uniform sheet electrodes through a simple step and enables cost reduction and mass production.

However, the method of JP-A-2001-85280 (patent publication (i)) using the conventional raw materials, namely, uncalcined polytetrafluoroethylene and conductive carbon results in a diffusion membrane (layer) which has unfavorably high volume resistance and insufficient electron conductivity and gas permeability. This can be rationalized by the excessive binding effect of the uncalcined polytetrafluoroethylene whose intended purpose is to impart water repellency. Furthermore, the method has difficult membrane production and is unsuitable for continuous mass production of membranes.

Under these circumstances, the present inventors earnestly carried out studies of a low cost process for mass production of diffusion membranes that have sufficient water repellency and no regional variation in properties. As a result, they have found that a resin composition containing uncalcined polytetrafluoroethylene, calcined polytetrafluoroethylene and a conductive substance can solve all the aforesaid problems by its capability of giving diffusion layers that have adequate water repellency and no local variation in properties, at reduced cost and with mass producibility. The present invention has been accomplished based on this finding.

JP-A-S52-97133 (patent publication (ii)) discloses a gas diffusion electrode including a sheet of a carbon material that contains a specific amount of carbon fibrils held together with a fluororesin, wherein the fibril lengths and diameters have a specific ratio. It also discloses a production process for gas diffusion electrodes comprising kneading and rolling the carbon material, the fluororesin and an auxiliary into a sheet and bonding the sheet with a catalyst layer mainly composed of an electrode catalyst and a binder, wherein the auxiliary is removed before or after the catalyst layer is bonded.

The gas diffusion electrode as described in the above patent publication is relatively thin and satisfactory in mechanical strength as mentioned also in JP-B-S63-19979 (patent publication (iv)), but the gas permeability thereof is insufficient.

JP-A-S58-165254 (patent publication (iii)) discloses a process for producing fuel-cell gas diffusion electrodes that comprises forced filling of carbon powder, a catalyst and ethylene tetrachloride resin into pores of a porous fiber membrane by means of suction force from below one side of the membrane.

JP-B-S63-19979 (patent publication (iv)) discloses a gas diffusion electrode material that is a fine porous network structure. This material comprises a number of polytetrafluoroethylene resin minute nodes containing conductive substance powder and a number of polytetrafluoroethylene resin fibrils containing no conductive substance powder that extend from each node to form three-dimensionally linked nodes, wherein all the minute nodes contact with each other or are in series at parts thereof.

JP-B-H01-12838 (patent publication (v)) discloses a gas and liquid permeable electrode material resulting from the bonding of a liquid permeable membrane that contains conductive substance powder in minute nodes and a conductive porous substrate of specific flexural strength. The liquid permeable membrane is a porous polytetrafluoroethylene resin membrane that has a number of minute nodes dimensionally linked through many fibrils with formation of a spiderweb network among the minute nodes. The minute nodes contact with each other or are in series at parts thereof.

JP-B-H05-52031 (patent publication (vi)) discloses a gas diffusion electrode material comprising:

a plurality of conductive powder-containing layers that are constituted of a number of polytetrafluoroethylene resin minute nodes containing conductive substance powder and substantially connected with each other, and a number of polytetrafluoroethylene resin fibrils that extend from each node and tridimensionally link the nodes; and a layer that is disposed between the plurality of layers and is constituted of a number of polytetrafluoroethylene resin minute nodes containing no conductive powder and a number of polytetrafluoroethylene resin fibrils extending from each node to tridimensionally link the nodes. These layers are directly engaged by pressure whereby the conductive powder-containing minute nodes are pressed and dispersed into among the fibrils that link the minute nodes containing no conductive substance powder. Consequently, electric conduction is achieved as a result of partial contact between the conductive powder-containing minute nodes or by the jumping effect.

However, these patent publications (ii) to (vi) provide gas diffusion electrode materials that are unsatisfactory in any of gas permeability, water repellency, mass producibility, production costs, conductivity and uniformity.

The present invention aims to solve the aforesaid problems related to the background art. It is an object of the invention to provide a low cost diffusion membrane that employs neither the expensive porous carbon fiber membrane nor porous carbon paper and has sufficient water repellency, uniform properties throughout the layer and suitable mass producibility.

It is another object of the invention to provide an electrode having a diffusion membrane (layer) with the above properties.

It is a further object of the invention to provide an efficient and low cost process for producing diffusion membranes having the above properties.

SUMMARY OF THE INVENTION

A diffusion membrane according to the present invention comprises uncalcined polytetrafluoroethylene, calcined polytetrafluoroethylene and a conductive substance.

Preferably, the diffusion membrane contains the uncalcined polytetrafluoroethylene in an amount of 1 to 30 wt % and the calcined polytetrafluoroethylene in an amount of 5 to 30 wt %.

The conductive substance is preferably a combination of graphite and carbon black.

Preferably, the diffusion membrane contains the conductive substance in an amount of 50 to 90 wt %.

An electrode according to the present invention includes:
any diffusion layer (membrane) as described above; and
a catalyst layer (membrane) disposed on the diffusion layer.

A process for producing diffusion membranes according to the present invention comprises dispersing uncalcined polytetrafluoroethylene, calcined polytetrafluoroethylene and a conductive substance in a dispersion medium, removing the dispersion medium, adding a liquid lubricant followed by kneading, compressing the resultant kneaded product (preferably a rod-shaped preform) to extend the same into a membrane, and removing the liquid lubricant.

The present invention enables low cost mass production of diffusion membranes having adequate water repellency and no regional variation in properties without use of the expensive porous carbon fiber membrane or porous carbon paper.

Since the diffusion membrane is made of other than the expensive porous carbon fiber membrane and porous carbon paper, the electrode of the invention can be efficiently mass produced at a reduced cost while ensuring uniform properties throughout all the area.

The production process for diffusion membranes according to the invention enables efficient production of diffusion membranes having the above properties.

BRIEF DESCRIPTION OF THE DRAWING

The drawing is a schematic view illustrating a contact condition of uncalcined PTFE fibers, carbon black, graphite powder and calcined PTFE powder in a diffusion membrane (sheet) according to the present invention.

DETAILED DESCRIPTION OF THE INVENTION

Hereinbelow, the diffusion membrane, electrode having the same, and production process for diffusion membranes according to the invention will be described in detail.

Diffusion Membrane (Layer)

The diffusion membrane (layer) of the invention contains uncalcined fluoropolymer resin, preferably uncalcined polytetrafluoroethylene (PTFE), and calcined fluoropolymer resin, preferably calcined polytetrafluoroethylene, and further a conductive substance.

Exemplary fluoropolymer resins include polytetrafluoroethylene (PTFE), modified PTFE, PVdF, ETFE, PCTFE, FEP and PFA, with PTFE being preferable from the viewpoints of diffusion membrane's heat resistance, chemical resistance and water repellency.

Production steps and raw materials for the diffusion membrane will be discussed in detail in the following exemplary embodiment which employs PTFE, preferable fluoropolymer resin in the invention.

Uncalcined Fluoropolymer Resin
Uncalcined PTFE)

The uncalcined fluoropolymer resin, preferably uncalcined PTFE, may be in the form of dispersion or powder. In view of dispersion properties, a dispersion is preferable.

Process for preparing the uncalcined PTFE is not particularly limited. For example, fine powder or an emulsion polymer such as a dispersion polymer, and a mixture thereof with molding powder obtained from a suspension polymerization may be used.

The uncalcined fluoropolymer resin, preferably PTFE, will generally range in mean particle diameter ($\phi$ from 0.1 to 0.5 μm, and preferably from 0.2 to 0.4 μm in view of dispersion properties.

Calcined Fluoropolymer Resin (Calcined PTFE)

The calcined fluoropolymer resin, preferably calcined PTFE, may take various forms, including powder and fibers. The powder form is preferable since it leads to improved water repellency of the resulting diffusion membrane (layer) and uniform dispersion.

The calcined PTFE powder may be obtained by heating uncalcined PTFE powder at temperatures ranging from the melting point to below the decomposition temperature of PTFE, optionally with pressurization. Unlike the uncalcined PTFE, the calcined PTFE powder particles have fusion marks on their surfaces. The calcined PTFE powder particles are often fusion bonded with each other at least part of their surfaces. The calcined and thereby fusion bonded PTFE generally has adequate spacings.

The calcined PTFE powder will desirably range in mean particle diameter $\phi$ from 5 to 100 μm, and preferably from 10 to 50 μm.

The calcined PTFE is superior in shear strength to the uncalcined PTFE.

The fluoropolymer resin powder may be partially or completely replaced with a water repellent substance contributable to the water repellency, such as silicone rubber.

When the uncalcined PTFE in the form of fibers and the calcined PTFE powder are used in combination (preferably in a ratio as described later), the resultant resin composition for diffusion layer can be easily sheeted into a diffusion membrane (layer) with excellent membrane producibility. Thus, the sheet diffusion membranes will have good mass producibility. Further, the resultant diffusion membrane (layer) displays excellent water repellency and has much more improved gas diffusibility and permeability as compared to when the PTFE consists of the uncalcined PTFE without addition of the calcined PTFE powder.

The above PTFE combination is preferable also because the electrode having the diffusion layer has a smaller volume resistance ($\Omega \cdot cm$).

Conductive Substance

The conductive substance may have any form such as powder or fibers. Examples of the preferred conductive carbon substances include graphite powder, carbon black, expanded graphite powder, activated carbon powder and carbon fibers. These conductive substances may be used singly or in combination of two or more kinds.

In the invention, graphite and carbon black are preferably used in combination as the conductive substances. This combined use is preferable because provided that the amount of the conductive substance is equal (unvaried), the volume resistance of the resulting diffusion membrane (layer) can be lowered.

The graphite (plumbago or black lead) may be natural (natural plumbago) or artificial (artificial plumbago or artificial black lead).

The graphite power will desirably have a mean particle diameter of 1 to 500 μm, preferably 5 to 200 μm, and more preferably 10 to 100 μm.

While the graphite particle diameters are on the order of μm, the carbon black has extremely small particle diameters on the order of nm (about 1/1000 of the graphite powder). For example, its mean particle diameter $\phi$ will desirably range from 1 to 500 nm, and preferably from 5 to 100 nm.

The combined use of conductive substances different in mean particle diameters leads to higher gas permeability of the resultant diffusion membrane (layer) and also results in that the electrode having the diffusion layer can enable higher performance of fuel cells or other electrochemical devices.

The diffusion membrane of the invention desirably contains:

1 to 30 wt %, preferably 10 to 20 wt % of the uncalcined PTFE, 5 to 30 wt %, preferably 10 to 20 wt % of the calcined PTFE, and 50 to 90 wt %, preferably 60 to 80 wt % of the conductive substance.

When the conductive substance is a combination of the carbon black and graphite, the carbon black desirably accounts for 5 to 30 wt %, preferably 10 to 20 wt %, and the graphite desirably accounts for 70 to 95 wt %, preferably 80 to 90 wt % of the combined carbon black and graphite (100 wt %).

When the aforesaid components have the above-specified amounts, the diffusion membrane (layer) and the gas diffusion electrode having the diffusion layer will display sufficient water repellency and superior gas diffusibility, gas permeability and conductivity. Particularly, the above quantitative relation between the uncalcined PTFE and calcined PTFE enables appropriate control of diffusion membrane producibility while maintaining adequate water repellency of the resultant diffusion membrane (layer). Consequently, continuous sheet production becomes possible and mass producibility of diffusion membranes may be enhanced, leading to reduction in product costs.

The resin composition for the production of diffusion membranes (layers) (diffusion membrane (layer) resin composition) may contain a dispersion medium, a liquid lubricant and the like in addition to the aforesaid components.

The dispersion media include water; aliphatic monohydric alcohols such as methanol and ethanol; and aliphatic polyhydric alcohols such as ethylene glycol, propylene glycol and glycerol.

Suitable liquid lubricants include water; aliphatic monohydric alcohols such as methanol and ethanol; aliphatic polyhydric alcohols such as ethylene glycol, propylene glycol and glycerol; and white oils. They may be used singly or in combination of two or more kinds.

The diffusion membrane (layer) resin composition may be prepared by combining the aforesaid components in arbitrary order, followed by stirring or mixing according to the conventional procedure.

In an embodiment of the present invention, the diffusion membrane may contain the uncalcined PTFE fibers, calcined PTFE powder, graphite powder and carbon black. The diffusion membrane in this embodiment has a structure as illustrated in the drawing. The uncalcined PTFE fibers tangle with the graphite powder particles, etc. and consequently these are substantially all connected with each other. Further, the carbon black fine particles are filled around the uncalcined PTFE fibers and thereby the graphite powder and the carbon black powder are substantially electrically connected. Moreover, the calcined PTFE particles are filled in the spacings created among the other components to impart adequate water repellency to the sheet (membrane).

The diffusion membrane contains the uncalcined PTFE, calcined PTFE and conductive substance in the identical amounts (ratios) to those in the diffusion layer resin composition.

The above diffusion membrane may be produced by dispersing the uncalcined fluoropolymer resin (preferably uncalcined PTFE), the calcined fluoropolymer resin (preferably calcined PTFE) and the conductive substance in the dispersion medium, removing the dispersion medium, adding the liquid lubricant followed by kneading, compressing the resultant kneaded product (preferably a rod-shaped preform) to extend the same into a membrane, and removing the liquid lubricant.

The rod-shaped preform prepared in the invention desirably contains the liquid lubricant in an amount of 5 to 70 wt %, preferably 10 to 65 wt %, and more preferably 30 to 65 wt % of the total weight thereof. These amounts of the liquid lubricant are preferable because the rod-shaped preform may be compressed as described later to give a uniform sheet diffusion membrane for electrode without any cracks or breakage. There are some possible methods to obtain the rod-shaped preform containing the liquid lubricant in the above amounts. One is to knead the conductive substance and the uncalcined and calcined fluorine-containing resins together with the liquid lubricant and shape the resultant kneaded product into such form by extrusion. It is also possible that the rod-shaped preform is produced with a smaller amount of the liquid lubricant than the desired level and is soaked in the liquid lubricant.

The rod-shaped preform is preferably such that the composition of the components and the density are uniform at any area. Extrusion of the rod-shaped preform is preferably performed under conditions so that the residual internal stress will be small and the differences in density and liquid lubricant content in the longer direction of the rod-shaped preform will be minor.

The rod-shaped preform produced in the invention preferably has a rod, or bar shape. Particularly, a long rod such as circular, rectangular or elliptic cylinder shape in which the cross section configuration perpendicular to the longer direction and the size thereof are constant, is preferable because of easiness in uniformly producing the sheet diffusion membrane for electrode.

In the invention, the rod-shaped preform, preferably in the figuration as described above, is compressed to give a sheet diffusion membrane for electrode. In the compressing, the rod-shaped preform is desirably spread out not to a sheet (plate) of large thickness but directly to a sheet of desired thickness in one operation. The compressing may be accomplished by any known method and at any temperatures not higher than the boiling point of the liquid lubricant. Particularly, rolling at such temperatures, preferably from 20 to 200° C., more preferably from 20 to 100° C., and even more preferably from 20 to 90° C. is desirable because the liquid lubricant will not cause foaming and the sheet diffusion membrane for electrode and electrode sheet may be produced without cracks.

The above compressing conditions are preferably fixed in order to produce uniform sheet diffusion membranes for electrode or electrode sheets as described later. In the case of rolling, the roll desirably has a uniform temperature distribution and a fixed temperature during the rolling.

The compressing, in the case of rolling, is desirably performed at a high compression stress of 0.05 to 2 t/cm, preferably 0.1 to 2 t/cm. This high compression stress gives a sufficient strength to the sheet electrode. As a result of the rolling, the preform is desirably spread out to 5 to 1000 times, preferably about 10 to 200 times longer than the original length (rod strength: length in the longer direction of the rod-shaped preform).

The compressing is followed by drying. The drying is carried out at temperatures capable of volatilizing the liquid lubricant used and lower than the decomposition temperature of the fluoropolymer resin such as PTFE. The drying temperature will range from 80 to 320° C., preferably from 150 to 300° C. depending on the drying time and the types of the fluoropolymer resins. The drying may be performed in an atmosphere of air or an inert gas.

The long sheet of electrode diffusion membrane obtained as described above may be cut into the desired size and shape appropriate for the application as an electrode diffusion membrane.

The electrode diffusion membrane should be in the form of sheet. Other conditions such as thickness, area and shape are not particularly limited and may be appropriately designed depending on the size and electric capacity of a fuel cell in which the electrode diffusion membrane is employed.

The sheet diffusion membrane for electrode may be used in wide range of cells or batteries using carbon electrodes. It is particularly suitable for use as a diffusion membrane for polarized fuel cell electrodes.

In the invention, the diffusion layer resin composition may be mixed with platinum-supported carbon as a catalyst layer component, whereby the gas diffusion layer and the catalyst layer may be integrated.

Electrode

The electrode according to the present invention has a layer made from the diffusion membrane and a catalyst layer disposed on the diffusion layer (membrane). (For example, the electrode possesses the diffusion layer (membrane) comprising the uncalcined PTFE, calcined PTFE and conductive substance (preferably carbon black and graphite), and a catalyst layer provided on the diffusion layer (membrane)).

The catalyst layer essentially consists of carbon black on which a catalyst such as platinum or platinum-ruthenium alloy is supported for promoting the electrode reaction.

Such electrodes may be prepared by the conventional methods, including those disclosed in JP-B-S63-19979, JP-B-H01-12838 and JP-B-H05-52031.

The above description illustrates embodiments of the diffusion membrane, electrode and production process for diffusion membranes in which the fluoropolymer resins are the uncalcined PTFE and calcined PTFE. However, the present invention may be suitably carried out using other uncalcined and calcined fluoropolymer resins in place of the uncalcined PTFE and calcined PTFE. Such alternative fluoropolymer resins include modified PTFE, PVdF, ETFE, PCTFE, FEP and PFA.

The invention enables reduction in material costs in the production of diffusion membranes and electrodes having the diffusion layers. This is achieved by replacement of the expensive porous carbon fiber membrane or porous carbon paper with a combination of low cost conductive substances of graphite and carbon black and also due to a combined use of uncalcined PTFE and calcined PTFE as the fluoropolymer resins.

Further, the combined use of the uncalcined PTFE and calcined PTFE permits appropriate control of diffusion membrane producibility from the resin composition for diffusion layer while maintaining adequate water repellency of the resultant diffusion membrane (layer). Consequently, a sheet having sufficient water repellency and no local variation in properties such as electric properties may be produced continuously to improve mass producibility of the sheet diffusion membranes, also leading to reduction in production costs of diffusion membranes and electrodes.

The electrode according to the invention includes the layer made from the diffusion membrane and the catalyst layer disposed thereon and has the above-described excellent properties. Since the diffusion layer is made of other than the expensive porous carbon fiber membrane and porous carbon paper, the electrode of the invention can be inexpensively mass produced with efficiency.

The production process for diffusion membranes of the invention can effectively produce diffusion membranes having the above properties.

EXAMPLES

Hereinbelow, the present invention will be described in greater detail by the following Examples. However, it should be construed that the invention is in no way limited to the Examples.

Examples 1-4 and Comparative Examples 1-2

Graphite of 35 µm mean particle diameter, carbon black of 50 nm mean particle diameter, uncalcined polytetrafluoroethylene (PTFE) of 0.2 µm mean particle diameter and calcined PTFE of 20 µm mean particle diameter were dispersed and mixed in water in amounts (wt %) shown in Table 1.

The mixtures were each dried and combined with 40 wt % (based on the dried mixture) of an alcohol as a liquid lubricant, followed by kneading.

The kneaded products were each expanded by a rolling machine at a roll temperature of 80° C. and a pressure of 440 kg/cm² to give a sheet of 0.40 mm thickness, 150 mm width and 1 m length.

The sheets were each dried in air at 150° C. for 30 minutes to yield a sheet diffusion membrane.

The sheet diffusion membranes of Examples 1-4 and Comparative Examples 1-2 were tested to determine their volume resistances.

The results are set forth in Table 1.

TABLE 1

|  | Graphite (wt %) | Carbon black (wt %) | Calcined PTFE (wt %) | Uncalcined PTFE (wt %) | Volume resistance (Ω · cm) |
|---|---|---|---|---|---|
| Ex. 1 | 70 | — | 20 | 10 | 1.565 |
| Ex. 2 | 70 | — | 10 | 20 | 2.447 |
| Comp. Ex. 1 | 70 | — | 0 | 30 | 6.771 |
| Ex. 3 | 50 | 20 | 20 | 10 | 0.655 |
| Ex. 4 | 50 | 20 | 10 | 20 | 0.880 |
| Comp. Ex. 2 | 50 | 20 | 0 | 30 | 0.919 |

The volume resistance was measured by the four-point probe method.

What is claimed is:

1. A diffusion layer membrane comprising 1 to 30 wt. % uncalcined polytetrafluoroethylene fibers, 5 to 30 wt. % calcined polytetrafluoroethylene powder having a mean particle diameter of 5 to 100 µm and a conductive substance.

2. The diffusion layer membrane as claimed in claim 1 wherein the conductive substance is a combination of graphite and carbon black.

3. The diffusion layer membrane as claimed in claim 2, which contains the conductive substance in an amount of 50 to 90 wt %.

4. The diffusion layer membrane of claim 1, wherein the diffusion layer membrane is obtained by dispersing uncalcined polytetrafluoroethylene, calcined polytetrafluoroethylene and a conductive substance in a dispersion medium, removing the dispersion medium, adding a liquid lubricant followed by kneading, compressing the resultant kneaded product to extend the same into a membrane, and removing the liquid lubricant.

5. The diffusion layer membrane as claimed in claim 1 which contains the conductive substance in an amount of 50 to 90 wt %.

6. An electrode comprising:
   a diffusion layer membrane comprising 1 to 30 wt. % uncalcined polytetrafluoroethylene fibers, 5 to 30 wt. % calcined polytetrafluoroethylene powder having a mean particle diameter of 5 to 100 µm and a conductive substance; and
   a catalyst layer disposed on the diffusion layer.

7. The electrode of claim 5, wherein the diffusion layer membrane contains a conductive substance in an amount of 50 to 90 wt %.

* * * * *

UNITED STATES PATENT AND TRADEMARK OFFICE
CERTIFICATE OF CORRECTION

PATENT NO. : 7,326,488 B2 Page 1 of 1
APPLICATION NO. : 10/499180
DATED : February 5, 2008
INVENTOR(S) : Michinao Hayashi It is certified that error appears in the above-identified patent and that said Letters Patent is hereby corrected as shown below:

Column 10, Line 54, Claim 7, "of claim 5" should read -- of claim 6 --

Signed and Sealed this

Seventeenth Day of June, 2008

JON W. DUDAS
*Director of the United States Patent and Trademark Office*